United States Patent
Hamar

(10) Patent No.: US 6,292,303 B1
(45) Date of Patent: Sep. 18, 2001

(54) LASER APPARATUS FOR SIMULTANEOUSLY GENERATING A PLURALITY OF LASER PLANES FROM A SINGLE LASER SOURCE

(75) Inventor: Martin R. Hamar, Wilton, CT (US)

(73) Assignee: Hamar Laser Instruments, Inc., Danbury, CT (US)

( * ) Notice: Subject to any disclaimer, the term of this patent is extended or adjusted under 35 U.S.C. 154(b) by 0 days.

(21) Appl. No.: 09/521,550

(22) Filed: Mar. 9, 2000

Related U.S. Application Data

(60) Provisional application No. 60/123,635, filed on Mar. 10, 1999.

(51) Int. Cl.[7] .............................. G02B 27/30; G01C 15/00
(52) U.S. Cl. ............................................ 359/641; 33/286
(58) Field of Search ..................... 359/641, 618, 359/629; 356/153; 33/286

(56) References Cited

U.S. PATENT DOCUMENTS

| | | | |
|---|---|---|---|
| 4,382,680 | 5/1983 | Hamar | 356/247 |
| 4,468,119 | 8/1984 | Hamar | 356/152 |
| 4,566,202 | 1/1986 | Hamar | 33/286 |
| 4,674,870 | 6/1987 | Cain et al. | 356/4 |
| 4,712,953 | 12/1987 | Witzel et al. | 409/131 |
| 4,714,344 | 12/1987 | Hamar | 356/152 |
| 4,815,845 | 3/1989 | Colbaugh et al. | 356/153 |
| 4,840,483 | 6/1989 | Haffner | 356/153 |
| 4,843,372 | 6/1989 | Savino | 340/540 |
| 4,889,425 | 12/1989 | Edwards et al. | 356/152 |
| 4,942,588 | 7/1990 | Yasui et al. | 372/103 |
| 4,963,022 | 10/1990 | Sommargren | 356/247 |
| 4,985,898 | 1/1991 | Furuya et al. | 372/106 |
| 5,048,030 | 9/1991 | Hiiro | 372/68 |
| 5,144,487 | 9/1992 | Hersey | 359/629 |
| 5,307,368 | 4/1994 | Hamar | 372/107 |
| 5,461,601 | * 10/1995 | Shinada et al. | 369/112 |
| 5,475,415 | * 12/1995 | Noethen | 347/241 |

FOREIGN PATENT DOCUMENTS

WO 96/09520  3/1996  (WO) .

* cited by examiner

Primary Examiner—Ricky Mack
(74) Attorney, Agent, or Firm—Anthony J. Casella; Gerald E. Hespos

(57) ABSTRACT

A laser apparatus is provided for producing a plurality of mutually perpendicular laser beams, the apparatus includes a laser generated for producing a diverging laser beam. At least one beam splitter is disposed to be impinged upon by the diverging input laser beam. The beam splitter reflects a portion of the diverging input laser beam 90° and permits passage of the remainder of the diverging laser beam. Collimating lenses are disposed to be impinged upon by the diverging laser beams leaving the beam splitter. The collimating lenses are fixed at right angles to one another. As a result, the collimating lenses will produce collimated output laser beams that are perpendicular to one another despite any angular shifting of the diverging beams impinging upon the collimating lenses.

9 Claims, 3 Drawing Sheets

LASER APPARATUS FOR SIMULTANEOUSLY GENERATING A PLURALITY OF LASER PLANES FROM A SINGLE LASER SOURCE

This application claims benefit of Provisional No. 60/123,635 filed Mar. 10, 1999.

BACKGROUND OF THE INVENTION

1. Field of the Invention

This invention relates to laser apparatuses, and, more particularly, to a laser apparatus for assessing alignment of a plurality of spaced-apart structural elements.

2. Description of the Related Art

Laser alignment systems include a laser for generating a laser beam and a light-sensitive target cell. The target cell is operative to generate electrical signals that identify the location of the center of energy of the laser beam impinging on the target cell. The light-sensitive target cell typically is mounted in a housing, and the housing is mounted to a structural element that must be aligned to another structural element or to some pre-established frame of reference. The laser is fixedly mounted to the other structural member or in proximity to the frame of reference. The laser then directs a beam on the light-sensitive target cell, and the target cell produces signals to identify both the position and the angular alignment of the target cell relative to the laser beam. Adjustments can be made to the structure on which the target is mounted so that the center of the target cell is positioned on the center of energy of the laser beam and so that the target cell is aligned substantially perpendicular to the laser beam.

Some prior art laser alignment systems employ a penta-prism. The penta-prism receives an input laser beam and permits a plurality of internal reflections. As a result of these reflections, an output laser beam emerges from the penta-prism at precisely right angles to the input laser beam. The penta-prism then may be rotated about the axis defined by the input laser beam. As a result, the output laser beam will sweep a perfectly flat laser plane. Systems of this type typically are used with a plurality of light-sensitive target cells mounted to a plurality of structural elements that require alignment relative to the laser reference plane. A system of this type is shown in U.S. Pat. No. 4,297,031.

U.S. Pat. No. 5,307,368 discloses a laser apparatus for generating up to three mutually perpendicular laser planes. In a first embodiment shown in U.S. Pat. No. 5,307,368 the apparatus is formed with three separate laser sources, and three separate beam adjustment means. Hamar Laser Instruments, Inc. manufactures and sells a laser apparatus, Model No. 723, formed in accordance with the first embodiment of U.S. Pat. No. 5,307,368. Hamar Model No. 723 is very effective and precise, but also is relatively expensive. The cost of the Hamar Model No. 723 laser apparatus can be reduced by using a single laser source, rather than three separate laser sources, and U.S. Pat. No. 5,307,368 shows three embodiments which utilize a single laser source to simultaneously produce three mutually perpendicular planes. Specifically, beam splitters and/or fiber optic elements are used to split a single laser beam into three separate beams. However, for each of these embodiments, beam adjustment means are provided for each of the resulting split laser beams to achieve mutual perpendicularity. Unfortunately, the costs of the beam adjustment means also are relatively high.

It is an object of the subject invention to provide a laser apparatus which utilizes a single laser source to simultaneously generate a plurality of laser planes.

It is also an object of the subject invention to provide a laser apparatus without beam adjustment means for simultaneously generating a plurality of laser planes arranged to be generally mutually perpendicular.

SUMMARY OF THE INVENTION

The above-stated objects are met by a laser apparatus which utilizes a single laser source that generates a diverging input laser beam. The apparatus utilizes the housing disclosed in U.S. Pat. No. 5,307,368, and may be used in conjunction with the rotating scanners or penta-prisms as disclosed in U.S. Pat. No. 5,307,368. A first beam splitter, preferably having 30% reflectivity, is placed in the path of the diverging input beam to reflect a portion of the beam in a direction perpendicular to the path of the input laser beam. Also, a second beam splitter, preferably having 50% reflectivity, is placed in the path of the diverging laser beam that passes through the first beam splitter to re-direct a portion of the laser beam in a direction perpendicular to the path of the input laser beam and perpendicular to the path of the first reflected beam. Collimating lenses are placed respectively in the paths of the three diverging beams, and collimate the respective beams. With this structural arrangement, three collimated output laser beams are generated which are mutually perpendicular.

The collimating lenses ensure substantial mutual perpendicularity of the output laser beams despite angular misalignment of the laser source relative to the beam splitters. In particular, angular shifting of a diverging beam relative to a collimating lens will cause the output beam to shift laterally, but will not affect the angular alignment of the output beam. Stated differently, regardless of the angle of a diverging input beam impinging on a collimating lens, the output beam will always be parallel to its alignment prior to the angular shifting of the input beam. With the apparatus of the subject invention, any angular shift of the generated diverging input laser beam will result in lateral shifting of the respective collimated output laser beams, but the perpendicular alignment of the collimated output laser beams will remain intact.

As is readily apparent, complex beam adjustment means are not required for use with this invention. The initial positioning of the collimating lenses to obtain three perpendicular output laser beams is all the adjustment that is required. Once the collimating lenses have been positioned to generate three mutually perpendicular output laser beams, the collimating lenses are immovably fixed to the housing using techniques known by those skilled in the art. The fixed collimating lenses, in combination with the single diverging input laser beam and the beam splitters, ensure the consistent generation of three perpendicular collimated output beams.

As a further enhancement apertures are formed in the housing of the apparatus or in structure between the beam splitters and the collimating lenses so that the resulting beams pass through the apertures. The apertures have considerably smaller diameters than the diameters of the resulting output beams themselves. In this manner, the respective beams "overflood" the apertures with only portions of the beams actually passing through the apertures. Thus, where the resulting beams are laterally shifted as the result of angular misalignment of the laser source relative to the beam splitters, the overflooded apertures ensure that the beams emitted from the apparatus remain constant in shape. More importantly, even though the beam approaching the aperture may shift, the portion of the beam emerging from the aperture will remain constantly along the same respective path. Thermal instability and settling of components, which may cause angular misalignment of the laser source and hence the input laser beam has no affect on the mutual perpendicularity of the output beams due to the combination of the diverging input laser beam, the beam splitters, the fixed collimating lenses and the overflooded apertures. Nevertheless it is preferred that the housing be formed of strain-free steel to minimize structural settling.

It should be noted that the method disclosed in U.S. Pat. No. 5,307,368 for achieving mutually perpendicular laser planes may be utilized herein for establishing perpendicularity between resulting output beams. Instead of adjusting the beams with beam adjustment means as in U.S. Pat. No. 5,307,368, the perpendicular arrangement of the beams is achieved by laterally shifting the respective collimating lenses. As used herein, "lateral shifting", and any derivative phrases thereof, is defined as movement in a direction transverse to, but not necessarily perpendicular to, the central longitudinal axis of a laser beam.

As an additional feature, where fine adjustment is desired, a tilt plate may be placed in the path of at least two, preferably all three, of the resulting beams between the respective beam splitters and the respective collimating lenses. The tilt plates allow for fine adjustment in pitch and yaw of the output beams, as disclosed in U.S. Pat. No. 5,307,368.

As a further feature of the subject invention, the laser source can be located remotely from the apparatus, and the laser source may produce a straight beam, rather than a diverging, laser beam. A converging lens is placed in the path of the straight laser beam to cause convergence of the beam. The converging lens is formed with a focal length to focus the converging laser beam at the common focus of the three split beams—i. e., the focus point of the converging laser beam is located at the equivalent point where the diverging laser source emits a laser beam as described above. Thus, in effect, the converging laser beam is the equivalent of the diverging laser beam described above. Beyond the focus point, the converging laser beam diverges and interacts with the apparatus as described above.

These and other features of the invention will be better understood through a study of the following detailed description and accompanying drawings.

DETAILED DESCRIPTION OF THE PREFERRED EMBODIMENTS

Figure 1:
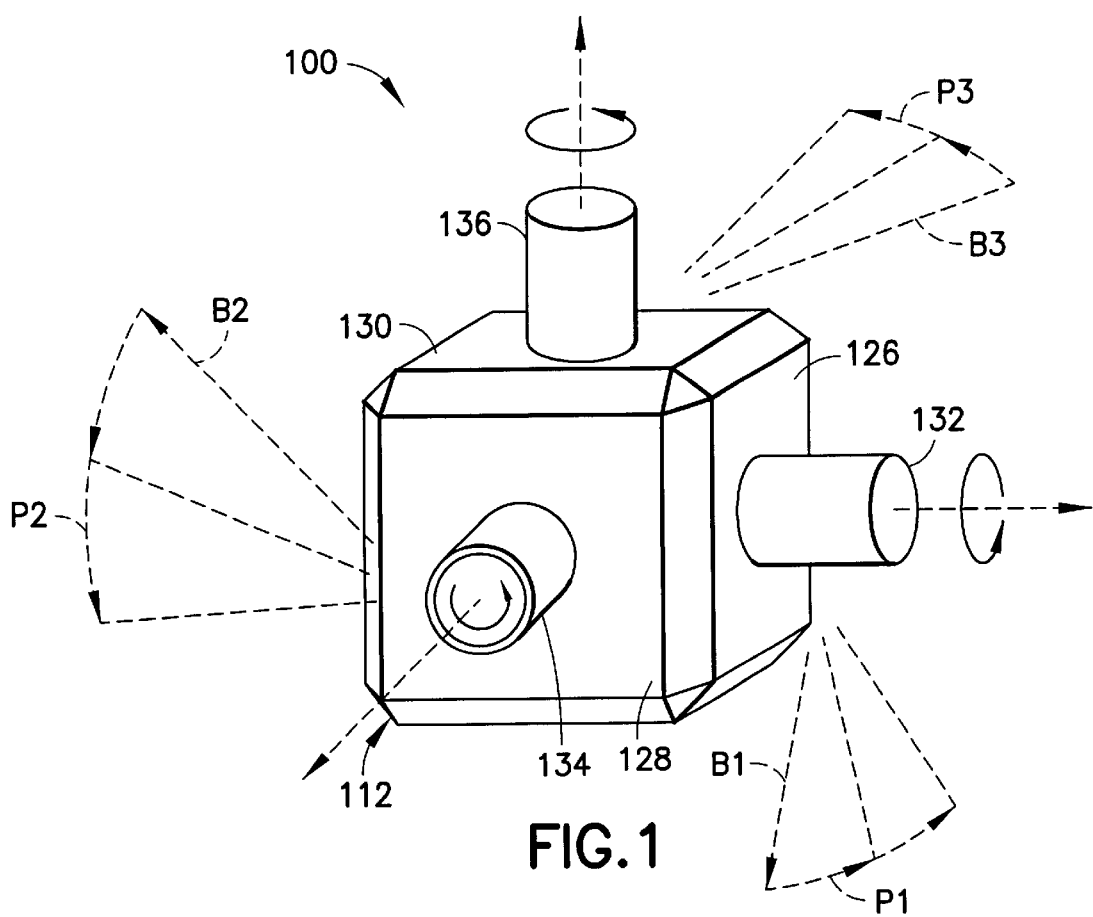
FIG. 1 is a perspective view of a laser apparatus in accordance with the invention.
Figure 3:
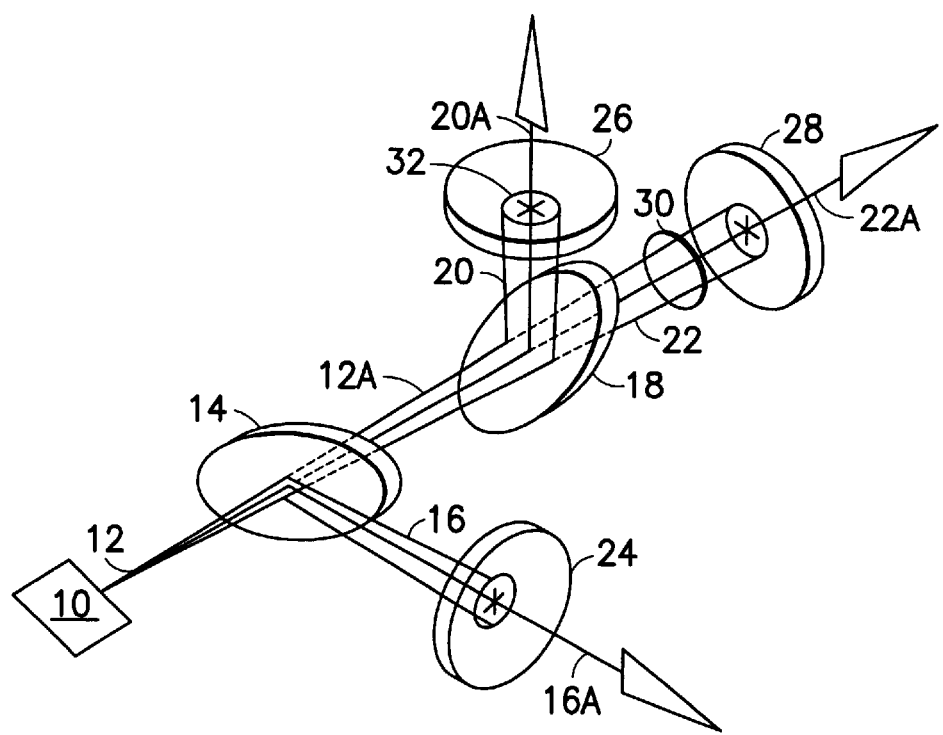
FIG. 3 is a schematic of the first embodiment of the invention shown with additional features.
Figure 4:
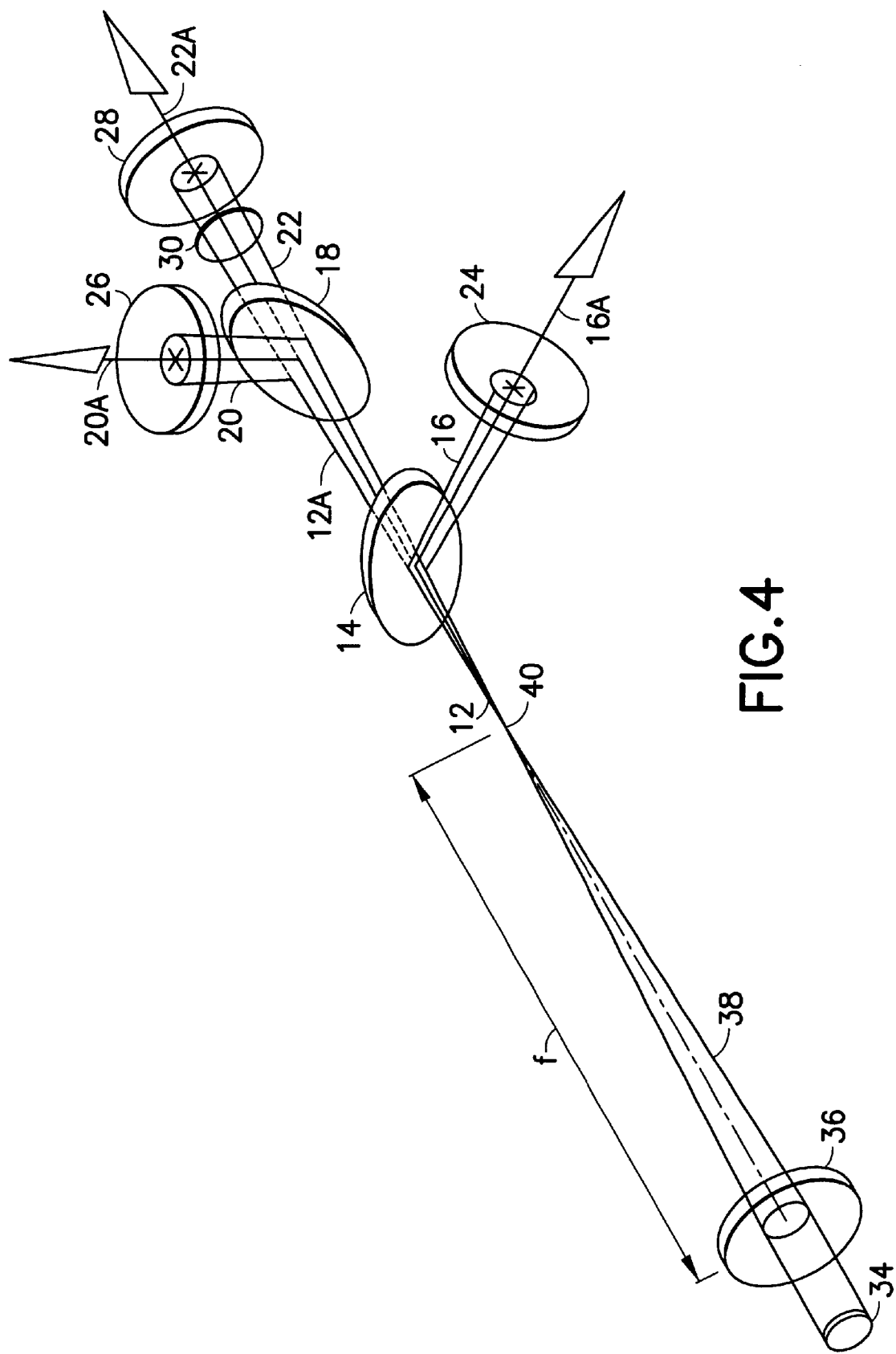
FIG. 4 is a schematic of a second embodiment of the internal components of the apparatus.

FIG. 1 shows a laser apparatus 100 in accordance with the subject invention. The apparatus 100 includes a rigid substantially cubical housing 112 with a hollow interior in which the various optical and electrical components of the apparatus 100 are mounted. Three substantially adjacent mutually perpendicular faces 126, 128 and 130 of the housing 112 are provided with apertures through which mutually perpendicular laser beams will project as described further below. The faces 126, 128 and 130 further are provided with scanner head 132, 134 and 136. The scanner heads are mounted to be selectively pivoted between a first position where the scanner heads are spaced from the apertures in the respective faces 126, 128 and 130 and a second position, shown in FIG. 1, where the scanner heads 132, 134 and 136 overlie the apertures. The scanner heads 132, 134 and 136 each include a penta-prisir that is operative to reflect a laser beam through precisely 90°. The scanner heads 132, 134 and 136 also are operative to rotate about the axis of the laser beam projecting through the respective apertures. Thus, the scanner heads effectively sweep the flat laser planes P1, P2 and P3. The laser planes will be mutually perpendicular to one another. The structural and functional features of the housing 112 and the scanner heads 132, 134 and 136 are substantially the same as in the above-described U.S. Pat. No. 5,307,368. However, the optical and electrical components of the apparatus of the subject invention differ significantly from U.S. Pat. No. 5,307,368 as explained further below and as illustrated in FIGS. 2–4.

Figure 2:
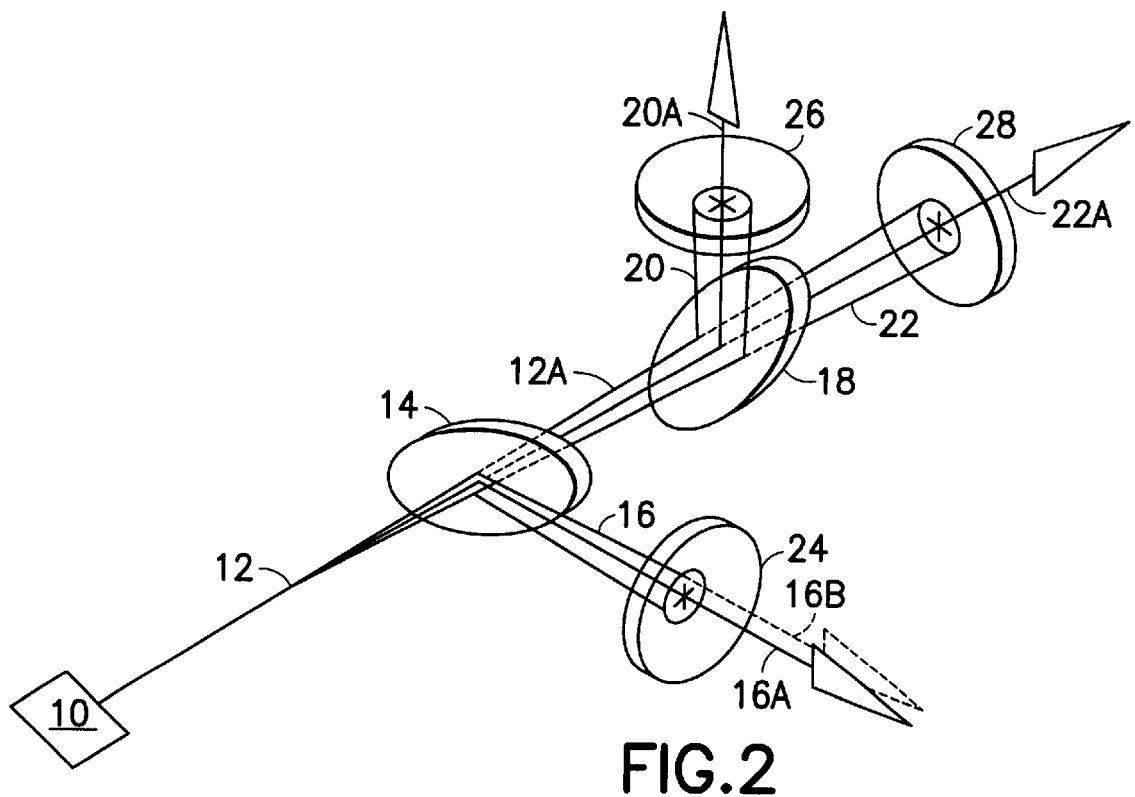
FIG. 2 is a schematic illustration of a first embodiment of the internal components of the apparatus.

FIG. 2 is a schematic illustration of a first embodiment of the invention, wherein a laser source 10, such as a laser diode, is provided for generating a single diverging input laser beam 12. A first beam splitter 14 is disposed in the path of the diverging input laser beam 12 to reflect and re-direct a portion of the input laser beam 12. It is preferred, that the reflectivity of the first beam splitter 14 be selected to re-direct 30% of the diverging input laser beam 12. As a result of the beam splitting, a first resulting output beam 16 is generated. The non-reflected portion of the diverging input laser beam 12 passes through the beam splitter 14 to generate a laser beam designated with the reference numeral 12A. Both the beam 12A and the first resulting output beam 16 are diverging.

A second beam splitter 18 is disposed in the path of the beam 12A. The beam 12A impinges on the second beam splitter 18 and causes a portion of the beam 12A to be reflected and re-directed as a second resulting output beam 20. The non-reflected portion of the beam 12A passes through the second beam splitter 18 to define a third resulting output beam 22. Both the second resulting beam 20 and the third resulting beam 22 are diverging.

The first and second beam splitters 14 and 18 are disposed such that the first, second, and third resulting output beams 16, 20, and 22 are generally perpendicular. In other words, the first resulting output beam 16 is generally perpendicular to both the second resulting output beam 20 and to the third resulting output beam 22. Likewise, the second resulting output beam 20 is generally perpendicular to both the first resulting beam 16 and to the third resulting beam 22, whereas, the third resulting output beam 22 is generally perpendicular to both the first resulting beam 16 and to the second resulting output beam 20. Due to optical and mechanical inaccuracies of the laser source 10, the beam splitters 14 and 18, their mounting and their housing, precise perpendicularity cannot and need not be achieved. However, in forming an apparatus in accordance with the subject invention, the laser source 10 and the first and second beam splitters 14 and 18 are fixed within the housing to increase the likelihood of maintaining the generally perpendicular arrangement.

First, second, and third collimating lenses, 24, 26, and 28, are disposed respectively in alignment with the first, second, and third resulting output beams 16, 20, and 22, respectively, to be impinged thereon. Preferably, the collimating lenses 24–28 are laser or achromatic lenses. As the respective first, second, and third resulting output beams 16, 20, and 22 pass through the first, second, and third collimating lenses 24, 26, and 28, respectively, the beams 16, 20 and 22 are collimated to generate first, second, and third collimated output laser beams 16A, 20A, and 22A, respectively.

The apparatus is formed such that the collimating lenses 24–28 initially are disposed in the paths of first, second and third resulting output beams 16, 20, and 22, respectively. Using the methodology disclosed in U.S. Pat. No. 5,307,368, the collimating lens 24–28 are laterally shifted to achieve substantial perpendicularity between the first, second and third collimated laser beams 16A, 20A and 22A. Having achieved substantial mutual perpendicularity (i.e., to within acceptable tolerances), the collimating lenses 24–28 are immovably fixed to the housing using techniques known by those skilled in the art.

The combination of the beam splitters 14 and 18, and the collimating lenses 24, 26, 28, advantageously allows for maintaining substantial perpendicularity between the collimated output beams 16A, 20A, and 22A, even if angular shifting of the diverging input laser beam 12 occurs relative to the beam splitters 14 and 18. In particular, an angular shift of the laser beam 12 results in angular shifting of the first, second, and/or third resulting output beams, 16, 20, and 22. The angular shifting of the first, second and third resulting beams 16, 20, and 22, however, is of no consequence, since the respective collimated laser beams 16A, 20A, and 22A, are simply shifted laterally with no angular change. For example, as shown in FIG. 1, a change in location of impingement of the first resulting output beam 16 on the first collimating lens 24 results in the first collimated beam 16A shifting laterally from the position shown in solid lines to a position represented by a beam in dashed lines indicated with reference numeral 16B. The two collimated beams 16A and 16B are parallel, and, therefore, the collimated laser beam 16B maintains its original perpendicularity to both the second and third collimated laser output beams 20A and 22A. Accordingly, any shifting of the first, second, and third resulting output beams 16, 20, and 22 will result in lateral shifting of the first, second, and third collimated output beams 16A, 20A, and 22A, respectively, with the initial, mutually perpendicularity being unaffected.

FIG. 3 shows an embodiment where more accurate perpendicularity between the first, second, and third collimated laser output beams 16A, 20A, and 22A can be attained. In particular, tilt plates 30, formed in accordance with the teachings of U.S. Pat. No. 5,307,368 are provided between the beam splitters 14 and 18 and the respective collimating lens 24, 26 and 28. It is preferred that three of the tilt plates 30 be utilized, thus, having one of the tilt plates 30 corresponding to each of the first, second, and third resulting output beams 16, 20, and 22. Alternatively, two of the tilt plates 30 may be utilized, with one of the first, second, and third resulting beams 16, 20, and 22 not being provided with a tilt plate 30. As shown in FIG. 2, the tilt plate 30 is disposed in alignment with the respective first, second, or third resulting beam 16, 20, or 22, intermediate the respective beam splitters 14, 18, and collimating lens 24–28. As disclosed in U.S. Pat. No. 5,307,368, the passage of the respective first, second, and third resulting beams 16, 20, and 22, through one of the tilt plates 30 results only in lateral shifting, with the output from the tilt plate 30 being parallel to the input. However a shifting of the point of impingement of the diverging output beam 16, 20 or 22 on the associated collimating lens 24, 26 or 28 enables fine tuning of the angular alignment of the output collimated beam 16A, 20A or 22A. Consequently, the tilt plates 30 allow for fine tuning the locations of impingement of the respective first, second, and third resulting beams 16, 20, and 22 on the collimating lenses 24–28 to achieve higher accuracy in perpendicularity between the collimated output laser beams 16A, 20A, and 22A. As, mentioned above, two of the tilt plates 30 may be utilized, wherein two of the collimated laser beams 16A, 20A, and 22A are adjusted using the tilt plates 30 relative to a non-adjustable collimated laser beam to achieve more accurate mutual perpendicularity.

As a further feature, "overflooded" apertures, such as those disclosed in U.S. Pat. No. 5,307,368, may also be utilized with the subject invention. In FIG. 3, an aperture 32 is schematically shown superimposed on the collimating lens 26. However, as disclosed in U.S. Pat. No. 5,307,368 the aperture 32 may actually be formed in the housing of the apparatus and is positioned to allow the passage therethrough of the second collimated laser beam 28. Likewise, apertures 32 may be provided for the first and third collimated laser beams 16A and 22A. As explained in U.S. Pat. No. 5,307,368, the apertures 32 are formed with a smaller diameter than the collimated laser beams 16A, 20A, and 22A to cull the respective beam and allow only a central high energy portion of the beam to pass through the aperture. Consequently, the overflooded apertures 32 increase the likelihood that laser beams of constant cross-section are emitted from the apparatus, and that the emitted beams remain constantly along the same paths, even though lateral shifting of the beam within the housing may occur.

As an alternative embodiment, a laser source may be used with the apparatus formed in accordance with the subject invention with is located remotely from the housing of the apparatus. Referring to FIG. 4, a laser source 34 is provided for generating a straight input laser beam rather than the diverging beam described above. The straight laser beam is directed to impinge upon and pass through a converging lens 36 to define a converging laser beam 38. The converging lens 36 is formed with a focal length f which causes the converging laser beam 38 to converge to a focus point 40. The focus point 40 is located relative to the first beam splitter 14 at an equivalent position as the laser source 10 described above. As shown in FIG. 3, the converging laser beam 38 diverges beyond the focus point 40 to be the equivalent of the diverging laser beam 12 described above. In all other respects, the embodiment shown in FIG. 3 functions as described above. It should be noted that the focal length f of the converging lens 36 is to be identical to the focal lengths of the collimating lenses 24–28.

What is claimed is:

1. A laser apparatus for generating a plurality of mutually perpendicular laser beams, said apparatus comprising:

means for generating a diverging input laser beam;

a beam splitter disposed to be impinged upon by the diverging input laser beam, said beam splitter reflecting a first portion of the diverging input laser beam approximately 90° to define a first diverging output laser beam, said beam splitter further permitting a remaining portion of the diverging input laser beam to pass through the beam splitter for defining a second diverging output laser beam;

a first collimating lens disposed to be impinged upon by the first diverging output laser beam for producing a first collimated output laser beam; and a second collimating lens fixedly mounted orthogonally to the first collimating lens and disposed to be impinged upon by the second diverging output laser beam, the second collimating lens producing a second collimated output laser beam perpendicular to the first collimated output laser beam.

2. The apparatus of claim 1, further comprising a second beam splitter disposed to be impinged upon by the second diverging output laser beam, said second beam splitter reflecting a portion of the second diverging output laser beam approximately 90° to define a third diverging output laser beam, said apparatus further comprising a third collimating lens fixedly secured in orthogonal relationship to the first and second collimating lenses and in a position to be impinged upon by the third diverging output laser beam, the third collimating lens producing a third collimated laser beam aligned perpendicular to the first and second collimated laser beams.

3. The apparatus of claim 2 further comprising a tilt plate adjustably mounted between the first collimating lens and the first beam splitter such that the first diverging output laser beam impinges on the beam splitter, angular alignment of the tilt plate relative to the first diverging output laser beam being adjustable for shifting the first diverging output laser beam transversely relative to the first collimating lens and for thereby adjusting the angular alignment of the first collimated output laser beam, whereby the tilt plate is adjusted for accurately achieving perpendicularity between at least the first and second collimated output laser beams.

4. The apparatus of claim 3, further comprising a second tilt plate adjustably mounted to be impinged upon by the second diverging output laser beam, whereby adjustment of the second tilt plate shifts the second output laser beam transversely relative to the second collimating lens for adjusting alignment of the second collimated output laser beam relative to the first and third collimated output laser beams, and for achieving mutual perpendicularity therebetween.

5. The laser apparatus of claim 1, wherein the means for generating the diverging input laser beam is a laser diode operative for producing a diverging laser beam.

6. The apparatus of claim 1, wherein the means for generating a diverging input laser beam comprises a laser diode operative for producing a straight laser beam and a converging lens disposed intermediate said laser diode and said beam splitter, said converging lens having a focus point between the converging lens and the beam splitter such that said laser beam converges toward said focus point and then diverges beyond said focus point.

7. The apparatus of claim 1, wherein said collimating lenses are rigidly mounted in a housing.

8. The apparatus of claim 7, wherein the collimated output laser beams define cross-sectional dimensions, and wherein the housing has apertures disposed to permit the output laser beams to pass therethrough, the apertures in the housing being smaller than the cross-section of the output laser beams such that each said aperture is overflooded for ensuring optimum intensity of the output laser beams projecting from said apparatus.

9. The apparatus of claim 1, further comprising rotatable scanner heads positionable to be impinged upon by the collimated output laser beams, each said scanner head being operative to reflect the respective collimated output laser beam 90° such that rotation of each said scanner head sweeps a laser plane.

* * * * *